Figure 1:
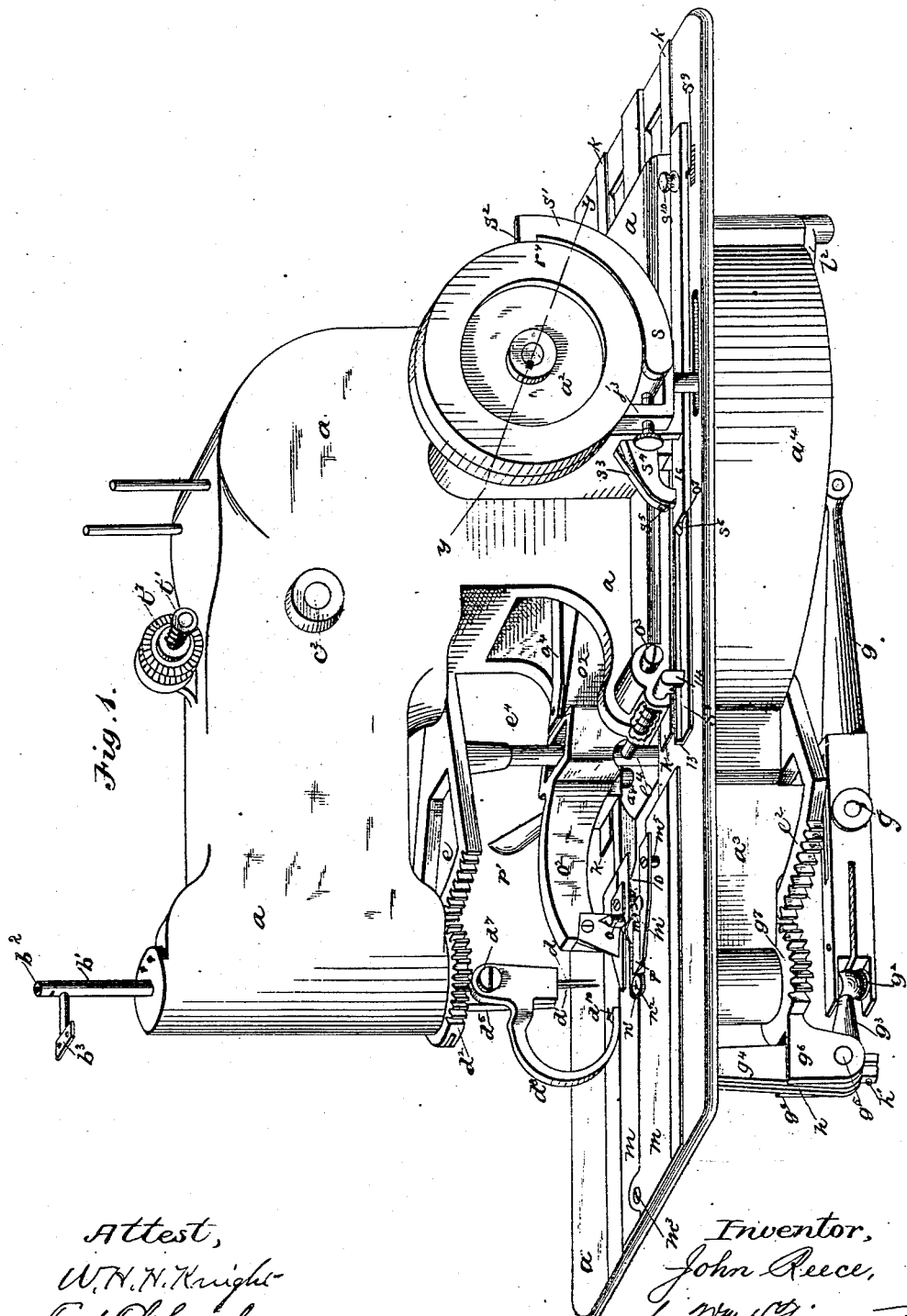

(No Model.) 6 Sheets—Sheet 1.

J. REECE.
Button Hole Sewing Machine.

No. 240,546. Patented April 26, 1881.

Attest,
W. H. H. Knight
Fred F. Church

Inventor,
John Reece,
by Wm. H. Sinclair
Asso. Atty.

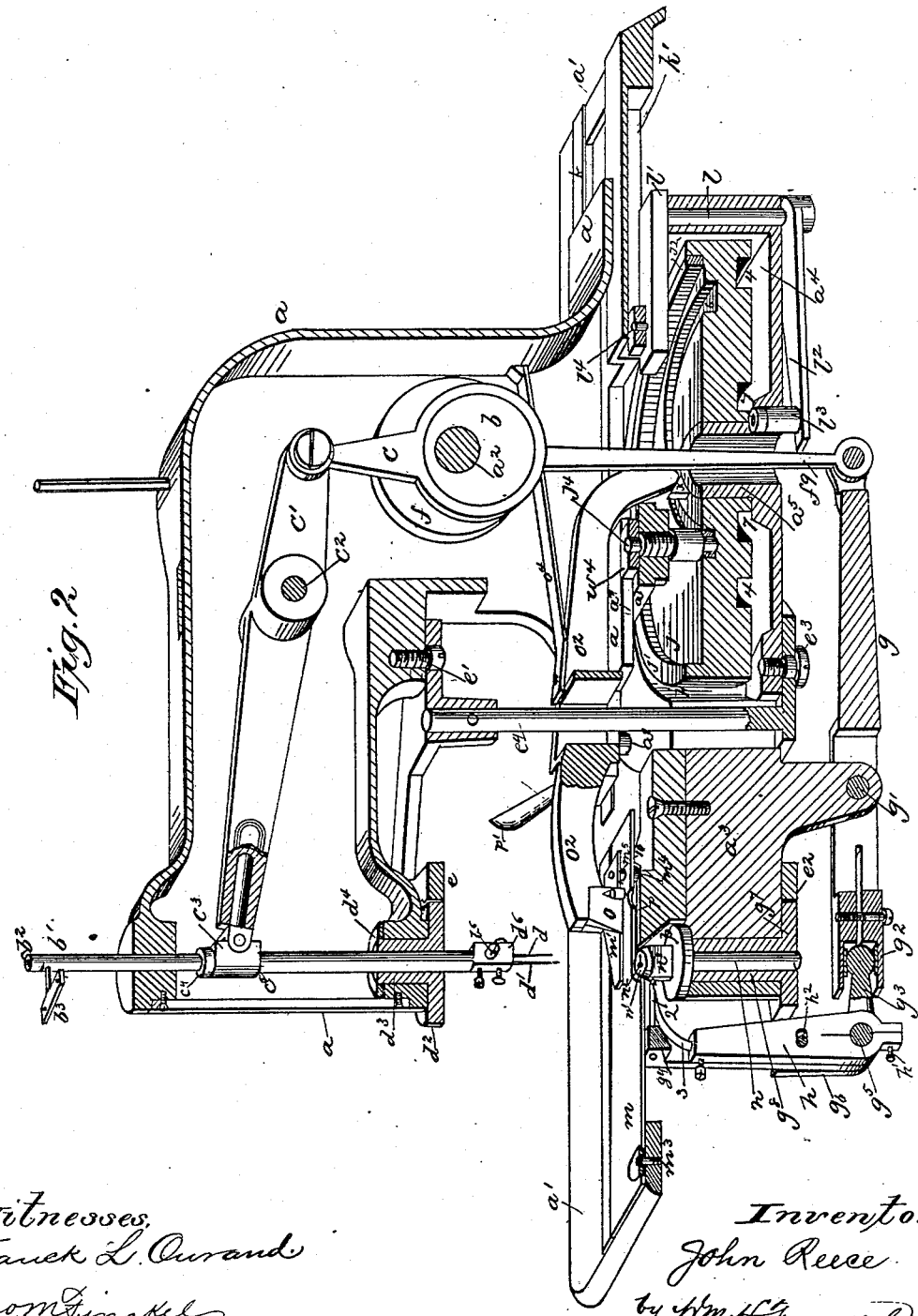

(No Model.) 6 Sheets—Sheet 3.
J. REECE.
Button Hole Sewing Machine.
No. 240,546. Patented April 26, 1881.
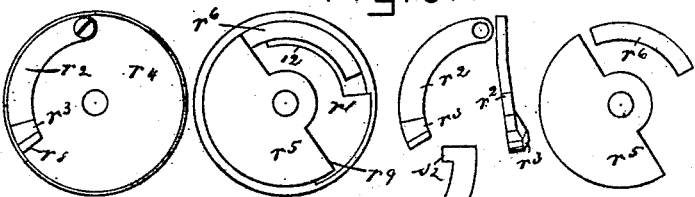
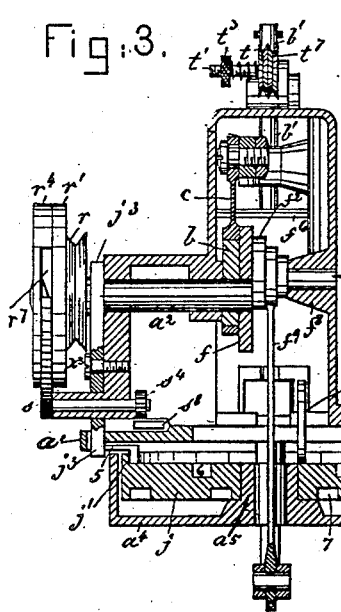
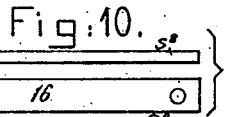
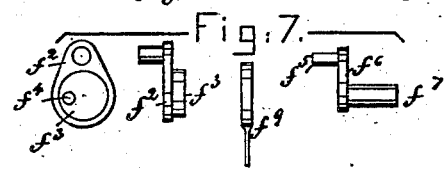
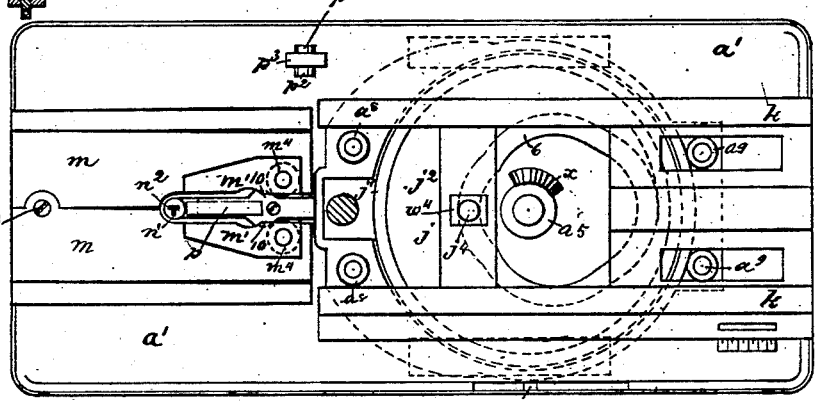
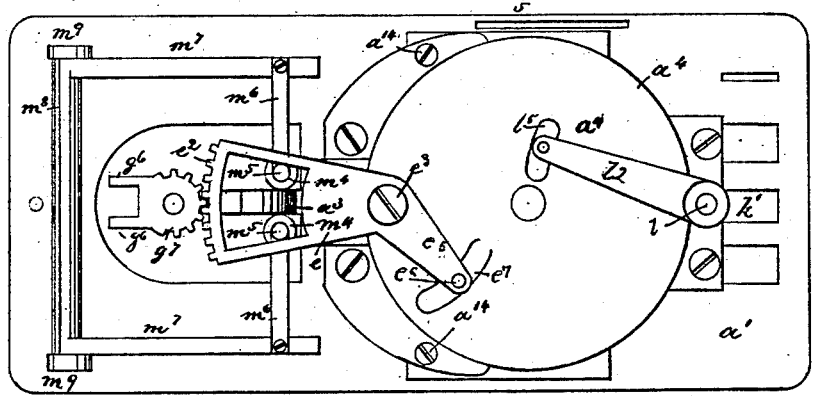
Witnesses:
L. F. Connor.
Arthur Reynolds.
Inventor,
John Reece.
by Crosby Gregory Attys

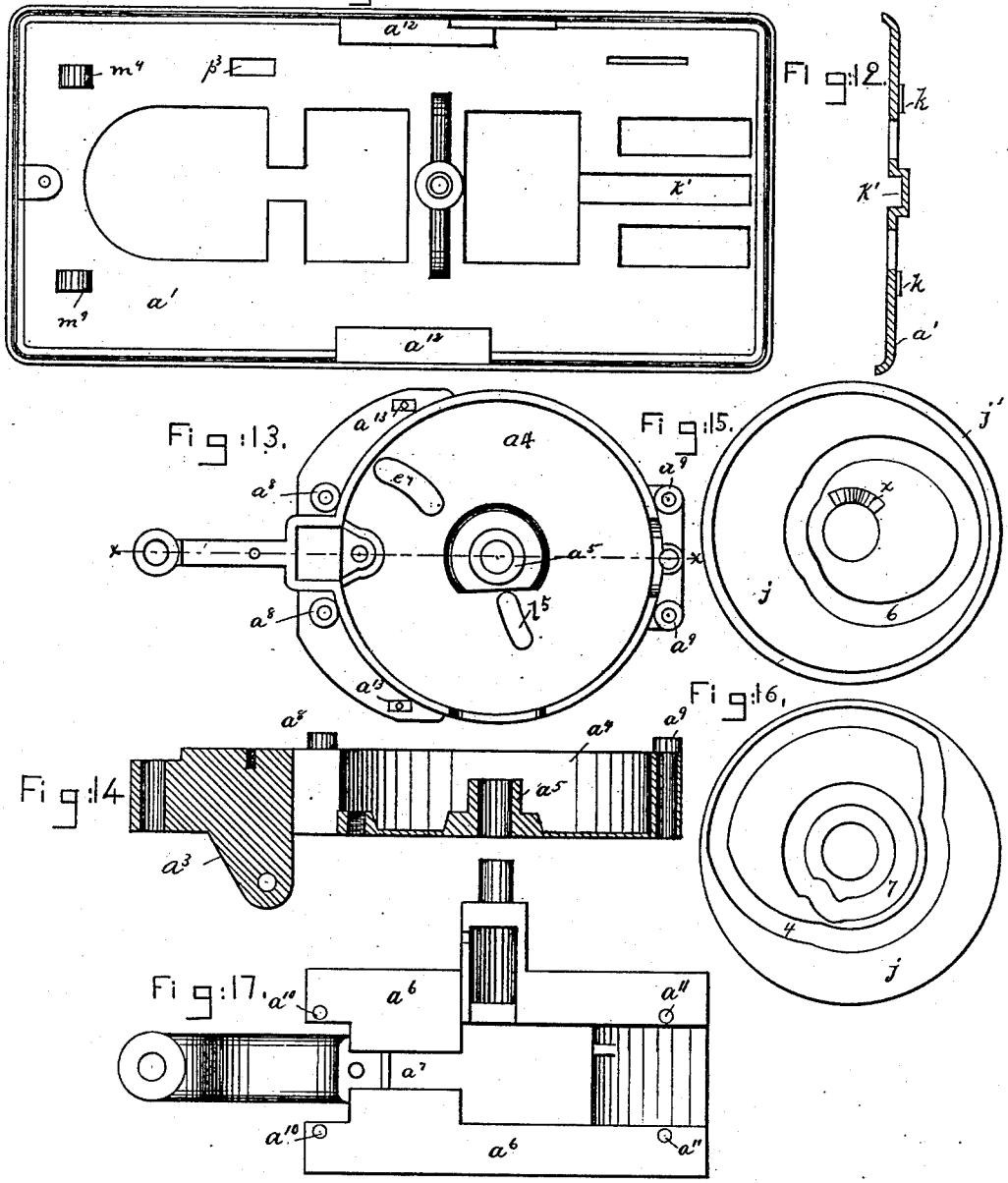

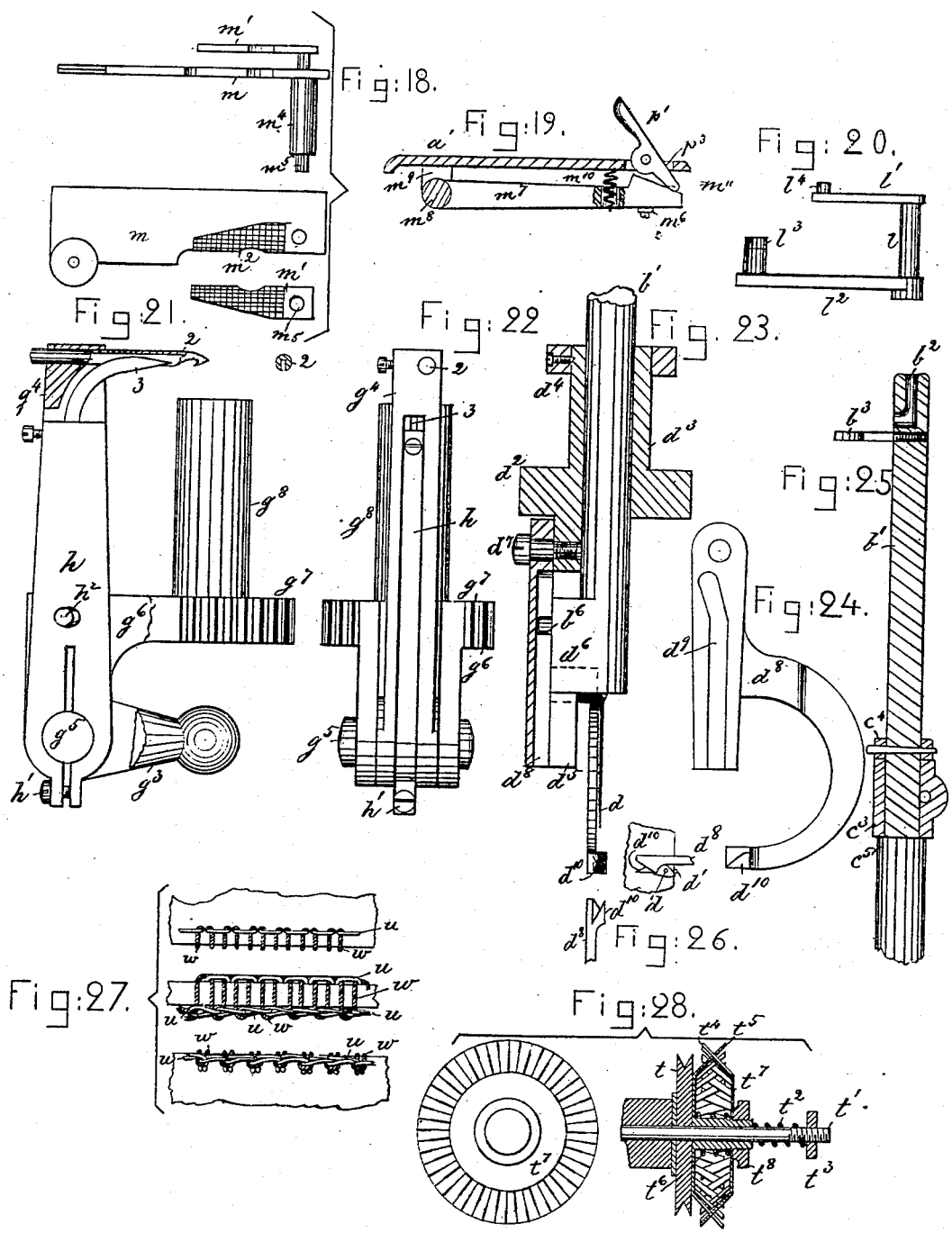

(No Model.) 6 Sheets—Sheet 6.
J. REECE.
Button Hole Sewing Machine.
No. 240,546. Patented April 26, 1881.
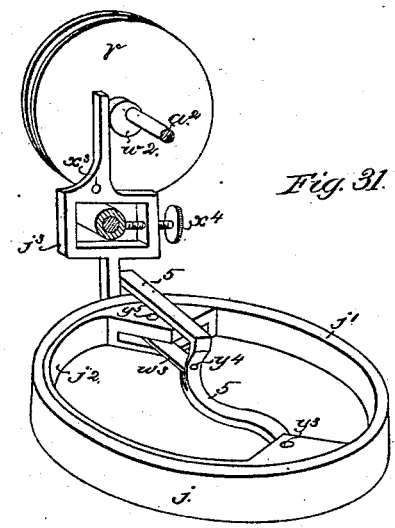
Fig. 31.
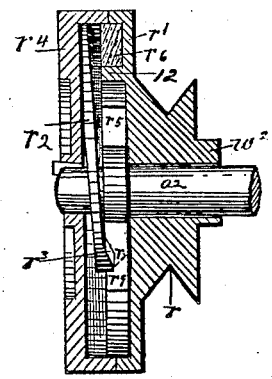
Fig 33
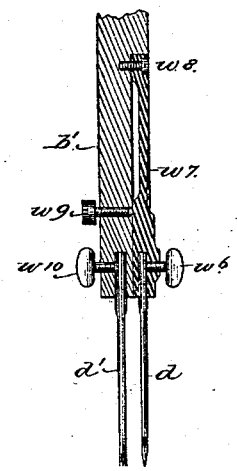
Fig. 29.
Fig. 32.
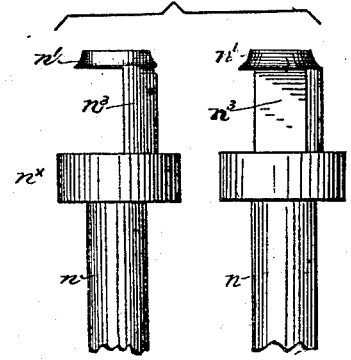
Fig. 30.
Witnesses.
Arthur Reynolds.
Bernice Noyes.
Inventor.
John Reece,
by Crosby & Gregory
Attys.

UNITED STATES PATENT OFFICE.

JOHN REECE, OF BOSTON, MASSACHUSETTS, ASSIGNOR, BY MESNE ASSIGNMENTS, TO THE REECE BUTTON-HOLE SEWING MACHINE COMPANY, OF PORTLAND, MAINE.

BUTTON-HOLE SEWING-MACHINE.

SPECIFICATION forming part of Letters Patent No. 240,546, dated April 26, 1881.

Application filed June 28, 1880. (No model.)

*To all whom it may concern:*

Be it known that I, JOHN REECE, of Boston, county of Suffolk, State of Massachusetts, have invented an Improvement in Button-Hole Sewing-Machines, of which the following description, in connection with the accompanying drawings, is a specification.

This invention relates to sewing-machines for stitching button-holes, and is an improvement upon that class of the said machines wherein the stitching mechanism is made to travel first along one side of the button-hole slit, then about the eye and along the other side of the slit.

In this machine the needle-bar, besides its regular reciprocations vertically, is partially rotated at each end of the button-hole slit, but stitches the material at but one of the said ends—viz., that one having the eye. This needle-bar has two thread-carrying needles, one of which—the shortest one—always penetrates the material back from the edge to be overstitched, while the other or longer needle always enters the slit. These two needles on one bar are not herein claimed as of this invention, except when combined with certain other things, as will be hereinafter carefully set forth and specified. The threads of these needles are entered and concatenated for an over-edge stitch by means of a looper, and this looper is so pivoted, as hereinafter described, as to rotate about a line coincident with the axis of rotation of the needle-bar if prolonged, thus enabling the looper to always operate correctly and in time with the needles on the semi-rotating needle-bar.

The machine has connected with it a controlling-bar, which, by adjustments in its position on the bed-plate, controls the starting and stopping of the vertical movement of the needle-bar and the movement of the looper to correspond with the size of the button-hole to be stitched, the movement of the needle-bar and its operative parts being automatically stopped as each button-hole is finished, no matter what may be its length.

A traveling or moving frame-work carries the stitching mechanism, and also carries a cutter to cut a button-hole slit in the material held in the clamp attached to the bed-plate. The threads for both needles pass over one tension device controlled by a single nut, and each thread is held at exactly the same tension under all conditions, whereby each of the threads used in making the button-hole stitch is fed off positively by the rotation of the tension device to thus insure just the proper amount of thread, and keep the purl of the stitch straight and uniform.

Figure 1 represents, in perspective, a button-hole sewing-machine, the parts being in the position they will occupy just prior to clamping the material and cutting the button-hole slit, containing my improvements; Fig. 2, a longitudinal section, in perspective, of the same, the operative parts being, however, in the position they will occupy when the needle-bar is up; Fig. 3, a vertical transverse section, on a reduced scale, of the machine in the line of the center of the main shaft, looking from the rear toward the front of the machine, the said shaft being in elevation, the looper-moving cranks being also in elevation; Fig. 4, a top-plan view with the bracket-arm and its attached parts removed; Fig. 5, an under-side view of Fig. 4, the looper and looper-carrier being omitted; Figs. 6 and 7, details of the crank for operating the lever that actuates the looper-carrier; Fig. 8, details of the clutching parts for starting and stopping the machine; Fig. 9, the lever to strike a dog and release the clutch-pulley to stop the machine; Fig. 10, an edge and top view of the controlling-bar to control the time when the stitching mechanism shall commence to operate as the frame-work is being traveled over the button-hole, the said bar governing, consequently, the length of the button-hole; Fig. 11, an under-side view of the bed-plate alone; Fig. 12, a cross-section thereof; Fig. 13, an interior view of the so-called removable casing and its attached arm, it forming part of the movable frame-work; Fig. 14, a longitudinal section thereof on the dotted line $x\,x$, Fig. 13; Fig. 15, a top view of the cam-disk that imparts to the mechanism its various movements; Fig. 16, an under-side view of the said cam; Fig. 17, an under-side view of the bracket-arm of the movable frame-work, the said figure showing the smooth bottom $a^6$ thereof adapted to rest upon the smooth-topped raised ledges of the fixed bed-plate as the relative positions horizontally of the bracket-arm and bed-plate are changed while stitching a button-hole; Fig. 18, details showing the cloth-clamp; Fig. 19, a detail showing the lever to depress the arm $m^7$ of the cloth-clamp; Fig. 20, a detail of the mechanism for moving the frame-work laterally at the end of the button-hole slit, to enable the stitching mechanism to stitch around the eye of the button-hole, and then along the opposite side of the button-hole; Fig. 21, an enlarged detail of the looper and looper-carrier, the looper being partially in section longitudinally, the said figure at the right also showing a cross-section of the looper; Fig. 22, a similar view of the left-hand part of Fig. 21; Fig. 23, an enlarged sectional detail of the gear about the needle-bar, the loop-spreader, and connections between it and the needle-bar; Fig. 24, an enlarged detail of the spreader; Fig. 25, an enlarged view, showing the needle-bar with its attached thread-guide in section, and also the block and collar and shoulder to insure proper reciprocations of the bar; Fig. 26, details of the point of the spreader; Fig. 27, the stitch produced by my machine; Fig. 28, details of my improved tension device. Fig. 29 is a detail drawing, showing the two needles, needle-bar, and adjusting devices therefor on a large scale. Fig. 30 is an enlarged side elevation of the needle-throat, in two positions, removed from the machine, showing the space in which the looper works. Fig. 31 is a detail showing the clutch mechanism for driving the disk which imparts the longitudinal and lateral movements to the traveling frame that carries the stitching mechanism, &c., showing also the mode of actuating said clutch mechanism from the main shaft; Fig. 32, a diagram showing the path in which the axis of the needle-bar moves while stitching a button-hole; and Fig. 33 is a cross-section on line $y\,y$, Fig. 1, of the clutch mechanism on the main shaft for actuating the needles, the looper, and cast-off.

The overhanging movable frame-work $a$, mounted on the stationary bed-plate $a'$, and directly carrying all the stitching mechanism and other moving parts, to be referred to hereinafter, has suitable journals to support the main shaft $a^2$ of the machine, having upon it an eccentric, $b$, for driving the needle-bar, the said eccentric being joined by an eccentric-strap, $c$, with one end of the needle-actuating lever $c'$, having its fulcrum at $c^2$, and connected in usual manner with a block, $c^3$, which surrounds the needle-bar, the latter being held loosely in the said block, rising and falling in unison with it by means of a nut or washer, $c^4$, and a shoulder, $c^5$, on the needle-bar, the said nut and shoulder being above and below the said block respectively. This needle-bar, at its lower end, has an eye-pointed cloth-penetrating needle, $d$, and a larger and longer eye-pointed over-edge or slit needle, $d'$.

The bracket-arm of the movable frame $a$, at front, is provided with a pinion, $d^2$, having a tubular axle, $d^3$, extended upward and fitted loosely into the lower end of the said arm, and at the upper end of this axle is a collar, $d^4$, to prevent the pinion dropping out of said arm. This axle serves as the lower bearing for the needle-bar $b'$.

The pinion $d^2$ is engaged by the teeth of the toothed sector $e$, which, at the proper times, as will be hereinafter described, will be made to partially rotate the needle-bar $b'$. This pinion has depending from it a slotted guide-plate, $d^5$, into and through which is extended a shoulder, $d^6$, of the needle-bar. (See Figs. 2 and 23.) This guide-plate $d^5$, at its front side, has pivoted upon it at $d^7$ the loop-spreader $d^8$, it having an irregular groove, $d^9$, into which is entered a pin, $b^6$, of the needle-bar, the said groove being so shaped as to cause the said pin to actuate the spreader during each descent of the needle-bar, causing the spreader to be moved or vibrated about its pivot or center of motion toward the needles, so that the forked point or end $d^{10}$ of the spreader will catch upon the thread of the over-edge needle $d'$, between the cloth and the eye of the said needle, and carry it backward over the edge of the material, the said spreader laying the thread of the said needle $d'$ back far enough from the said edge being overstitched, and upon the surface of the material immediately under the path of descent of the work-penetrating needle $d$, which latter is shorter than the needle $d'$, so that the work-penetrating needle, before penetrating the material, enters the loop so formed and laid upon it by the spreader.

The main shaft carries a disk, $f$, upon which, at $f'$, is pivoted a link, $f^2$, having an eccentric, $f^3$. This eccentric has at one edge of it a hole, $f^4$, to receive a pin, $f^5$, carried by an arm or crank, $f^6$, of a short journal, $f^7$, sustained in a hub, $f^8$, of the main frame-work $a$. This eccentric $f^3$ is embraced by the eccentric strap and link $f^9$, attached at its lower end (see Fig. 2) to the rear end of a lever, $g$, pivoted at $g'$ upon an arm, $a^3$, fixed to the movable main frame-work $a$. This eccentric $f^3$ and crank-pin $f^5$, located as described with relation to each other, act to produce for the looper mechanism to be described an irregular motion in such time with relation to the eccentric $b$ for moving the needle-bar as to enable the needles and looper to properly co-operate in the formation of the stitch, all the said eccentrics being operated by the same shaft. This lever $g$ is, at its outer end, provided with a fork, $g^2$, to receive a ball-like termination of the short arm $g^3$ of the carrier $g^4$ for the looper 2, the latter being made substantially like a crochet or hooked needle, and not carrying a thread.

The length of the short arm of the lever $g$ and that of the looper-carrier are so proportioned that the connection between the said two arms is made in a plane coincident with the axis of the needle-bar; or, in other words, the contact-points between the forked end $g^2$ of the arm $g$ and the short arm $g^3$ of the carrier $g^4$ are so made and located that were the needle-bar $b'$ prolonged it would enter the center of the said point. This connection of the lever $g$, or driver for moving the looper-carrier $g^4$, with the said looper-carrier in the manner designated enables me to operate the said looper-carrier and looper in a like manner and for a like distance with relation to the needles under all changes of position of the needles and looper, thus preserving the proper time of operation of the looper with the needles under their changed positions, as hereinafter described. This looper-carrier is mounted loosely upon a pin, $g^5$, fixed in ears $g^6$ of a pinion, $g^7$, having a hollow axle, $g^8$, extended upward through a hole in the arm $a^3$, fixed to the movable frame-work $a$. This hollow axle receives within it the shank $n$ of the throat-plate $n'$, made circular at its upper end or top, and provided with a slot, $n^2$, to receive both needles $d$ $d'$ at each descent thereof, there being below the said throat-plate an open space, $n^3$, to receive the looper 2 and permit it to co-operate in the proper manner with the threads carried by the said needles to form the button-hole stitch, as hereinafter set forth. This throat-plate $n'$ is shown separately in Fig. 30. In practice the upper part thereof next the letter $n'$, through which the needles descend, will be about three-eighths of an inch in diameter, while the part $n^\times$, five-eighths of an inch below it, will be one and one-eighth inch in diameter. The lower end of this shank $n$ receives a suitable set-screw by which to securely attach it to the gear-axle.

The cast-off 3 is mounted upon the cast-off carrier $h$, which is fitted to move more or less tightly upon the fixed pin $g^5$ by means of a binding-screw, $h'$, extended through the forked or split part of the said cast-off carrier, (see Figs. 2 and 21,) so that the friction between the said cast-off carrier and the pin may be regulated at will.

The cast-off carrier $h$ is provided with a slot to receive a pin, $h^2$, projecting from the looper-carrier, the said pin having more or less lost motion or play in the said slot, so as to operate the cast-off carrier and cast-off only at the extremes of motion of the looper and its carrier, so as to enable the said cast-off to operate in the usual manner to shut or cover the hook of the looper 2, or uncover it, so that it will either hold or discharge the loops of thread in the proper manner. This looper 2, in operation, enters the loops of thread carried by both the needles, and being uncovered, it, on its return motion, catches below the work or material the loop or thread carried by the penetrating-needle $d$ and draws it laterally toward the edge of the work being stitched and through the loop of thread in the eye of the over-edge needle $d'$, the hook of the looper being closed or covered by the cast-off 3 by the time that the said hook is ready to pass out from the loop of thread carried by the needle $d'$, thus preventing the looper catching the thread of the said needle.

The eye of the penetrating-needle $d$, being located nearer the under surface of the work than the eye of the needle $d'$, gives the looper sufficient time to draw the loop of the penetrating-needle $d$ out through the loop of the needle $d'$ before its eye, in the ascent of the said needles, reaches the under side of the work, and the loop of thread so drawn from the penetrating-needle acts to lock the loop of thread carried by the over-edge needle $d'$.

The looper holds the loop of thread drawn out by it, as described, while the stitch is being drawn taut, and also until the needles have again descended, as before described, when the looper is again moved forward through the loops of both of the said needles, as before described, catching the loop formed in the thread of the perforating-needle and drawing it, as before described, through the loop of the needle $d'$ and through that loop of the thread of the perforating-needle previously drawn out laterally, as described, through the loop of the needle $d'$, and yet held by the shank of the looper 2, the cast-off closing the hook of the looper, to permit the loop being taken from the thread of the perforating-needle to be drawn through the loop previously taken therefrom, thus enchaining below the work the thread of the perforating-needle with or through the loops made in the thread of the needle $d'$, while above the work, as before described, a bend or bight in the thread of the needle $d'$, laid back by the loop-spreader from the edge being stitched, worked, or covered, is entered and held by the thread of the perforating-needle. In practice I prefer to have the thread carried by the over-edge or non penetrating needle $d'$ cover the inner edges of the button-hole slit, and this thread may be of any suitable size—usually larger than the thread of the perforating-needle $d$.

The threads for the two needles enter the central hole, $b^2$, at the top of the needle-bar $b'$, (see Fig. 25,) and thence out laterally through suitable eyes in the thread-guide $b^3$, the delivery of the thread being thus kept uniform as the needle-bar is rotated.

The gears $d^2$ $g^7$, in connection with the needle-bar $b'$ and looper-actuating mechanism, are moved or turned progressively in unison by means of sectors.

The sector $e$, that engages the pinion $d^2$, is pivoted at $e'$ upon the bracket-arm of the frame-work $a$, and the sector $e^2$ at $e^3$ on a circular casing, $a^4$, affixed to and forming a portion of the movable frame-work, and these two sectors are joined together by a rod or connection, $e^4$, which causes them to move simultaneously in the same direction at the same speed.

The lowermost sector, $e^2$, has a backwardly-extended arm, $e^5$, (see Fig. 5,) provided with a roller pin or stud, $e^6$, that is extended through a slot, $e^7$, in the said casing $a^4$, and extended into a groove, 4, at the under side of the grooved cam or disk $j$, mounted upon a hollow stud, $a^5$, of the said casing, the said groove being of the proper shape to hold the sectors, pinions, needle-bar, needles, and looper in position for all the stitching mechanism to travel horizontally along the straight sides of the button-hole slit, and at the proper time, as when the eye part or enlarged end of the button-hole is being stitched, to gradually move the said sectors so as to progressively turn the pinions, needle-bar, and looper, so that the penetrating-needle will travel in a circle about the enlarged end or eye of the button-hole. During this semi-rotation of the needle-bar the over-edge needle travels slower than the penetrating-needle, and in the arc of a smaller circle.

In practice the needles $d$ $d'$ will be made laterally adjustable on the needle-bar, according to distance back from the edge desired to be covered by the stitch.

Referring to Fig. 29, the needle $d$, which always penetrates the material, in order that it may be adjusted laterally, is held by the screw $w^6$ in the spring-arm $w^7$, connected by screw $w^8$ with the needle-bar $b$, an adjusting-screw, $w^9$, being inserted in the said bar to control the distance between the needles $d$ $d'$. Needle $d'$ is held, as usual, by the screw $w^{10}$.

The cam-disk $j$, at its upper side, (see Figs. 2, 15, and 31,) is herein shown as recessed, so as to leave about its periphery an upwardly-projecting flange, $j'$, within which is placed a friction-clutch device, $j^2$, (shown in detail in Fig. 31,) and a connected lever, 5, the end of which (see also Figs. 3 and 4) is acted upon by a lever, $j^3$, vibrated by a suitable eccentric or cam, $w^2$, fast to a belt-wheel, $r$, which wheel and cam are loose upon the main shaft $a^2$. The clutch device $j^2$ is herein shown as a curved piece of metal placed within the recess at the face of the disk $j$, and within the flange $j'$. The lever 5, pivoted to one end of this clutch device, as in Fig. 31, and extended out over the flange $j'$, to be struck by the lever $j^3$, is also connected with the said clutch device by a link, $w^3$, that movement of the lever 5 which tends to bring the pivots $y^3$ $y^4$ $y^5$ into the same straight line spreading the clamping device $j^2$ and causing it to gripe the rim $j'$ and turn the disk $j$.

This friction device is not of my invention, but is a device commonly employed to move the feed-wheel in sewing-machines, and instead of it any other usual friction device may be employed.

The lever $j^3$ has its fulcrum at $x^3$, and the approach of its upper end toward the center of the shaft $a^2$ is controlled by the adjusting-screw $x^4$, which will abut against any suitable part of the frame-work.

The bed or cloth plate $a'$ of the machine is fixed, and has attached to it the cloth-clamp to be described.

The movable frame-work $a$ $a^3$ $a^4$, which carries the stitching and cutting mechanisms, is mounted upon the flat and narrow elevated ledges $k$ of the stationary bed-plate, so as to be moved backward and forward thereon in the direction of the length of the button-hole slit for a distance equal to the length of the longest button-hole to be stitched on the machine. In addition to this forward-and-backward movement, the said frame-work and its connected parts are also moved laterally or vibrated about the stud $j^4$ as a center, as the needles (one edge of one side of the button-hole slit having been stitched) are to pass around the eye of the button-hole to stitch the other straight and parallel side of the said button-hole slit, the said stud $j^4$ being fixed in the stationary plate $a'$ and resting in the groove 6 at the upper side of the disk $j$, as in Fig. 2.

The forward motion of the movable frame $a$ $a^3$ $a^4$ and connected needle-bar and looper mechanism is produced by the cam-groove 6 at the top of the cam-disk $j$, into which extends the roller pin or stud $j^4$, connected with the fixed bed-plate $a'$. The bottom part, $a^6$, of the movable frame $a$ is provided with a slot, $a^7$, (see Fig. 17,) to receive the upper end, as herein shown, of the said pin or stud $j^4$, extended above plate $a'$ and provided with a block, $w^4$. (See Figs. 2 and 4.) Rotation of disk $j$, containing groove 6, the said groove receiving the stud $j^4$ of the fixed plate, causes the said disk and frame-work, in which its carrying-stud is mounted, to slide longitudinally. The flat or smooth bottom part, $a^6$, of the frame $a$, resting on the elevated smooth ledges $k$ of the plate $a'$, may be moved forward thereon or be vibrated or moved laterally thereon, at suitable times, about the stud $j^4$ as a fulcrum, different parts of the frame-work so vibrated about the said stud occupying at different times different positions longitudinally with relation to the said stud, according to the part of the groove 6 occupied by the stud $j^4$.

Connected with the casing $a^4$ of the movable frame is a rock-shaft, $l$, having two arms, $l'$ $l^2$. The lower arm, $l^2$, has a pin or roller-stud, $l^3$, which is extended through the slot $l^5$ in the casing $a^4$ and made to enter the cam-groove 7 at the under side of the said cam-disk $j$. The other arm, $l'$, of the said rock-shaft $l$ has a pin or stud, $l^4$, that enters the groove $k'$ at the lower side of the fixed bed-plate $a'$ and at the rear of the stud $j^4$. The cam-groove 7 of the rotating disk $j$, having its carrying-stud or axis made as a fixed part of the movable frame $a^4$, (see Figs. 2 and 3,) acts upon the stud $l^3$ of the arm $l^2$ of the rock-shaft $l$ and turns the said rock-shaft $l$, and as the pin $l^4$, carried by the arm $l'$, bears upon or rests against the fixed or immovable bed $a'$, it results that the rock-shaft $l$ must move away laterally from the slot $k'$ of the fixed plate $a'$, thus carrying with it the movable frame-work $a$ $a^3$ $a^4$, vibrating the latter and all the stitch-making parts laterally more or less in the arc or a circle about the fixed stud $j^4$. The extent of the forward and vibratory movements of the stitching parts depends upon the disk $j$ and the shape of the grooves 6 7 therein, they acting to change the position of the movable frame and needle-bar, to enable the needles (one side of the button-hole having been stitched) to pass about the rounded end or eye of the button-hole, ready to be again moved horizontally along and parallel with the opposite side of the button-hole next to be stitched. In other words, the resultant action of the two cam-grooves 6 7 is such as to cause the axis of the needle-bar $b'$ to travel in a path corresponding in shape with the straight part and rounded eye of a button-hole, the said path being delineated in Fig. 32.

The material or garment in which the button-hole to be stitched is made is inserted between the upper and lower members, $m$ $m'$, of the clamp, which is made movable, so as to expand the button-hole while held by the clamp. The button-hole is cut by an automatically-operated cutter, $o$. The under parts, $m$ $m$, of this clamp, serrated as at $m^2$, are pivoted at $m^3$ upon the stationary work-supporting or cloth plate $a'$. At or near the rear end of these jaws are tubular hollow posts $m^4$ $m^4$, to receive within them the rods $m^5$ $m^5$, with which are connected the upper arms or members, $m'$ $m'$, of the clamp, the said arms being serrated at their under sides, as in detail-figure 18. The lower end of each of these rods $m^5$ is attached to a spring, $m^6$, (see Figs. 5 and 19,) carried by the arms $m^7$ of a rock-shaft, $m^8$, secured to the under side of the bed-plate in lugs or ears $m^9$. The arms $m^7$ are normally pulled upward by a spring, $m^{10}$, beneath the bed-plate. (See Fig. 19.)

On the casing $a^4$ are tubular projections $a^8$ $a^9$, to receive through them suitable screws to attach the said casing to the part $a$ and leave a space between for the bed-plate $a'$, the said screws (or they may be bolts) entering holes $a^{10}$ $a^{11}$ in the sill of the frame $a$.

At the under side of the bed-plate are two narrow flat surfaces, $a^{12}$. In the casing $a^4$ are set two blocks, $a^{13}$, made adjustable by suitable screws $a^{14}$. The said screws, acting upon the said blocks $a^{13}$ after the parts $a^4$ and $a$ are secured together, may be made to press against the surfaces $a^{12}$ with more or less force and take up any wear between the sliding frame-work and the bed-plate $a'$.

The blade $o$ of the button-hole cutter is carried by a lever, $o^2$, pivoted at $o^3$ on the frame $a$. The long end of the lever $o^2$ is curled or turned down, and is, by a spring, $o^4$, (see Fig. 2,) held down so as to be struck by a cam, $x$, (see Fig. 2,) on the disk $j$.

The bed-plate $a'$ has connected with it a cutting-block, $p$, having at each side cam-shaped edges 10, (see Fig. 4,) that at the first part of the backward movement of the frame $a$ strike the studs $m^4$, hereinbefore described, and separate them, causing the upper and lower parts, $m$ $m'$, of the clamp to separate. Prior to this movement, however, the cloth or material is supposed to have been pinched between the upper and lower members of the said clamp by the lever $p'$, (see Fig. 19,) the lower end of which is made to act upon and depress the outer end of one of the arms $m^7$ of the rock-shaft $m^8$, and the button-hole cutter is supposed to have been depressed by the cam $x$, and to have cut the button-hole slit and to have risen from the cloth. The lever $p'$, pivoted in ears $p^2$, is extended through the slot $p^3$ in line with one of the arms $m^7$, which arm has its end $m^{11}$ beveled or inclined, and is supported or drawn upwardly by the spring $m^{10}$. The arms $m^7$ being connected by the rock-shaft $m^8$, and supporting the upper members, $m'$, of the clamp by means of their pins $m^5$, connected to the springs $m^6$, as before described, it will follow that the backward movement of the lever $p'$ will depress the arms $m^7$ and the clamp-arms $m'$ to hold the button-hole material while being cut, spread, and stitched; but as soon as this lever is released, as at the completion of a button-hole, the beveled end $m^{11}$ of the spring-drawn arms will throw the lever forward and release the goods. The depression of the clamps by the lever $p'$ causes sufficient friction between them and the bed-plate to hold them and the button-hole spread apart while the stitching is being done.

The main shaft has upon it a loose band or belt wheel, $r$, (see Figs. 3, 8, and 33,) having a rigidly-attached clutching-disk, $r'$, made hollow to receive the half-disk $r^5$, and also a piece of india-rubber, $r^6$, the latter being embraced at its sides by the lip 12 fast on $r'$.

$r^4$ is a clutching-disk fast on shaft $a^2$, and provided with a spring-dog, $r^2$, which has a wedge-shaped side, $r^3$.

When the machine is stitching the edge or face $r^8$ of the dog $r^2$ is in engagement with the edge $r^9$ of the half-disk $r^5$, so that the disks $r'$ and $r^4$ will rotate together with the shaft $a^2$. The rubber $r^6$, against which the half-disk $r^5$ rests, yields under the pressure of contact of parts $r^2$ and $r^5$, so as to take the jar of the starting off the stitching mechanism. These parts $r'$ $r^2$ $r^4$ $r^5$ $r^6$ constitute a clutch, and also a balance-wheel by which to drive the machine.

Upon the frame $a$ is pivoted a stopping device, $s$, which is made as a rocker-shaft with two arms. (See Figs. 1, 3, and 9.) The arm $s'$ of the said stopping device has a finger, $s^2$, to enter a notch, $r^7$, at the edge of the disk $r^4$, and when the said finger is permitted to enter the said notch it acts upon the beveled end $r^3$ of the dog $r^2$ and disengages said dog from the half-disk $r^5$, whereby the parts $r$, $r'$, and $r^5$ are free to run loose on the shaft $a^2$.

$s^3$ is a spring, arranged to bear upon the lever $s$ in such manner as to hold down the toe $s^5$ of the lever-arm $s^4$. By this spring this toe is brought into operative contact, as hereinafter fully specified, with an incline, $s^6$, on an adjustable controlling-bar, $s^8$, pivoted at $s^9$ upon the bed-plate $a'$, and made longitudinally adjustable thereon by the screw $s^{10}$, according to the length of the button-hole being stitched. This bar is provided at one edge with a rib, 13, which is embraced by a notched spring-held pin, 14, (see Fig. 1,) carried by the frame $a$. The inner end of this pin 14 extends back far enough to meet the rod $e^4$ that connects the sectors $e$ $e^2$, so that as the said sectors are swung toward the right of the machine the said controlling-bar is swung outward, placing its inclined projection $s^6$ in the path of the said toe $s^5$.

It will be understood that the lever $j^3$, which turns the cam-disk $j$, is always operative to move the said disk, and consequently the frame $a$ travels when the clutching parts are disengaged. When the material in which the button-hole slit is to be made has been placed between the members of the clamp the cutter is caused to descend and cut the button-hole slit and quickly rise. During this motion the sectors have continued to move, and the needles and loop-spreader are simultaneously turned until the needles are so placed that the needle $d'$ will enter the slit and the other needle, $d$, the fabric; but the said needles are not made to descend until the clutched parts are engaged by the withdrawal of the finger $s^2$, as before described, and this will not happen until the toe $s^5$ strikes the incline $s^6$. At the proper time, however, or when the needles arrive at the end of the slit, the toe $s^5$ strikes the incline $s^6$ and operates the stopping-lever to withdraw its toe $s^2$ and permit the clutching parts to engage and start the needle and looper mechanisms. When the toe $s^5$ of the stopping-levers $s$, in the forward movement along the outer side of the button-hole, again reaches the line of the incline $s^6$, the said toe travels over a part of the controlling-bar $s^8$ at one side of the part immediately at the rear of and in direct line with the said incline, and comes opposite a shoulder, $o^7$, which is at the same distance from the pivoted end of the controlling-bar as the said incline $s^6$, and permits the spring $s^3$ to throw the stopping device into notch $r^7$ and instantly stop the operation of the needle and looper mechanism. During all this movement of the frame $a$, when the stitching is to be done, the toe $s^5$ runs on an upper level or portion, 16, of the said controlling-bar. To bring this shoulder $o^7$ in line with the path of the toe $s^5$, I avail myself of the before-mentioned spring-pin 14, which, as the rod $e^4$ moves away from it, is free to act to draw the controller-bar in the same direction, and thus place said shoulder $o^7$ in said path of the toe $s^5$.

Of the two threads entering into the stitch made by my machine and carried by the two needles $d$ $d'$, it is necessary, in order to locate the purl, that the proper amount of thread be delivered to each needle, and that each thread should be kept at the same tension. To do this I employ for the threads a rotating tension device, about which each thread is wound once, so that the tension device turned by one thread will positively roll off the other thread for the proper distance. In this particular form of my invention I desire the tension device to feed off more thread for the penetrating-needle than for the over-edge needle, and I have consequently so devised that part of the tension device over which the thread carried by the penetrating-needle moves that it may have its diameter increased as much beyond the diameter of the other part of the tension device about which the other thread of the other needle is wound as may be desired. This part $t$ of the tension device, over which the thread going to the over-edge needle is wound, is placed upon a rod, $t'$, having at its outer end a spring, $t^2$, and a nut, $t^3$. This part $t$ is a disk provided with a V-shaped periphery or groove, and is not of my invention. Fixed to this part $t$ is the hub or central part of the flanged disk $t^4$, provided at its edge with a series of equidistant prongs, $t^5$. About the hub of this disk $t^4$ is placed a spring, $t^6$, and then there is placed on the said hub the fellow disk $t^7$, made like the disk $t^4$. The prongs of these two disks constitute that part of the tension device about which the thread passing to the cloth-penetrating needle is wound and interlocked, as shown in Fig. 28, and kept so by the nut $t^8$, and by moving the said nut, and by the said spring $t^6$, these two disks $t^4$ and $t^7$ may be made to approach each other and diminish the effective diameter of the said disks, or vice versa, thus regulating as may be desired an excess of delivery of one thread over the other.

In Figs. 1 and 3 I have not shown with particularity the construction of the thread-tension device, considering it unnecessary to do so, because the said tension device is fully shown in details in Fig. 28.

I do not broadly claim a traveling stitching mechanism, nor two needles, one to penetrate the cloth and the other to enter the slit, nor a cutter to cut the button-hole slit while the material is held in a clamp.

Fig. 27 shows a top, an edge, and an underside view of the stitch made by my machine from the two needle-threads $u$ $w$. The thread $u$ will be carried by the work-penetrating needle $d$ and the thread $w$ by the over-edge needle $d'$. The thread $w$ covers the edge being overstitched, and the thread $u$, after passing through the bight of the thread $w$ above the work, is carried through the work and enchained with itself and through the loops of the thread $w$ below the work.

I claim—

1. In a button-hole sewing-machine, the following instrumentalities, viz: a bed-plate upon which the material is held, a frame-work, a reciprocating needle-bar, its two needles, one to penetrate the fabric, the other to pass over the edge to be overstitched, and the loop-spreader, a looper-carrier and hooked looper, and means to move said frame-work longitudinally upon said bed-plate, and to operate the said spreader and looper-carrier and reciprocate the needle-bar, whereby the spreader lays the loop of one needle-thread back upon the material before the needles descend, and the looper engages the loop of the perforating-needle below the material and draws it through the loop of the over-edge needle, and holds it while the needles are drawn up above the material and until after the next descent of the needle-bar, when the loop of the perforating-needle is drawn through its previous loop, held, as described, by the said looper, the combination being and operating substantially as set forth.

2. In a button-hole sewing-machine, a cloth-holding clamp connected with the bed-plate, the reciprocating needle-bar, its two needles, $d\ d'$, the looper-carrier and looper, and the movable frame carrying the said needle-bar and looper-carrier, combined with means to partially rotate the said needle-bar and looper-carrier and to move the said frame and sewing parts longitudinally, substantially as described.

3. In a button-hole sewing-machine, the frame, the needle-bar for the two needles $d\ d'$, and the looper-carrier, and the pinions connected with the needle-bar and looper mechanism, combined with the sectors to partially rotate the needle-bar and looper devices in unison, and with means, substantially as described, to reciprocate the needle-bar and vibrate the looper-carrier, to operate substantially as set forth.

4. The movable frame-work, reciprocating needle-bar, provided with two needles, looper-carrier vibrated from a point coincident with the axis of the needle-bar, and devices to partially rotate the said needle-bar and looper-carrier at the proper times, combined with a rotating cam-disk to reciprocate the frame-work and stitching devices in the direction of the length of the button-hole to be made, and the rock-shaft $l$, mounted, as described, on the movable frame, and adapted to vibrate the movable frame laterally, as described, and with it the stitching mechanism above and below the material, whereby the said stitching mechanism is caused to travel at first along one edge of the slit and then along the other side of the slit, as herein set forth.

5. In a button-hole sewing-machine, a frame-work for the needle-bar and looper and a bed-plate to hold the material, combined with two cams and with mechanism between the said cams and frame-work, whereby the needle-bar, by the movements imparted to it longitudinally and laterally of a button-hole by the said frame, is caused to travel backward in a substantially straight line until near the eye of the button-hole, then backward and outward and inward, then forward and inward to follow the contour of the edge of the enlarged eye part of the button-hole, and then forward substantially in a straight line along the other side of the button-hole, as set forth.

6. The bed-plate and clamp secured to it, the frame-work and its overstitching mechanism, composed, essentially, of a reciprocating needle-bar having two needles, $d\ d'$, and the looper-carrier and looper, the stud $j^4$ on the frame-work, rigidly-connected arms $l'\ l^2$, a rotating disk provided with grooves 6 7, to act upon the said stud and arms and move the frame-work longitudinally and laterally, combined with means to partially rotate the said needle-bar, looper-carrier, and looper at the proper time to enable the needles and looper to be turned at the eye of the button-hole to stitch about the said eye, all substantially as specified.

7. A needle-bar and an overstitching-needle combined with a penetrating-needle, a spring-arm secured to said needle-bar and carrying said penetrating-needle, and an adjusting device for moving the spring-arm and its needle to vary the distance between the needles to form deeper or narrower stitching about the button-hole, substantially as described.

8. The needle-bar provided with the shoulder $d^6$ and pin $b^6$, means to reciprocate it, the partial gear connected with the said needle-bar, and means to partially rotate the said gear and needle-bar, combined with the guide $d^5$ and spreader $d^8$, connected with the said gear, the combination being and operating substantially as described.

9. The looper-carrier and looper the partial gear $g^7$, provided with shaft $g^5$, upon which the looper-carrier is supported, and the arm $g^3$, having a ball-like termination, combined with the vibrating lever $g$ and sector $e^2$, and means to move the said lever and sector to enable the looper to be vibrated during the partial rotation of the said gear, substantially as and for the purpose described.

10. The looper-carrier and its connected lever $g$, combined with the shaft $a^2$, the disk $f$, the link $f^2$, eccentric $f^3$ thereon, the journal $f^7$, arm $f^6$, pin $f^5$, and the link $f^9$, substantially as described.

11. In a button-hole sewing-machine, a clamp and bed-plate to hold the material, the frame-work $a$, the button-hole-cutting device connected therewith, combined with a cam-disk to operate the said button-hole cutter to cut a slit in the material held by the clamp, and then to move said frame-work longitudinally upon said bed-plate to remove the blade of the cutter from above the clamp, substantially as described.

12. The frame-work $a$ and bed-plate $a'$, and the cloth-clamping mechanism movably connected with the bed-plate, combined with the cutting-bed and means for moving the cutting-bed and frame longitudinally with relation to the cloth-clamping mechanism, the said cutting-bed being provided with inclines or projections to act upon the clamp and spread the button-hole as the relative positions of the bed-plate and frame-work are changed longitudinally, substantially as described.

13. The main shaft $a^2$, the belt-pulley loose on the said main shaft, the disk or pulley $r^4$, fixed to said shaft, and means to connect it with or disconnect it from the loose pulley, the stopping-lever $s$ and its spring, the movable frame-work which carries the needle and looper mechanisms, and means to move the said framework, in combination with the controlling-bar, whereby the belt-pulley is disengaged from the fixed pulley $r^4$ to enable the shaft $a^2$ to remain at rest while the belt-pulley continues to run loosely on the said shaft, substantially as and for the purposes set forth.

14. In a sewing-machine for stitching button-holes, the adjustable controlling-bar provided with the incline and shoulder and elevated part 16, combined with a stopping-lever, constructed as described and acted upon by the controlling-bar, and with the clutch-pulley mechanism, whereby the stitching parts may be driven or remain at rest, as and for the purpose described.

15. The pivoted controlling-bar and its ledge 13, and the spring-pin, combined with the shaft $e^4$ of the sectors, to vibrate it at the proper times, substantially as described.

16. The needle-bar $b'$, its central thread-receiving orifice, $b^2$, and guide $b^3$, the vibrating loop-spreader, the two eye-pointed needles carried by the said needle-bar, the looper to engage and concatenate the two needle-threads together below the material in the formation of the described stitch, and means to operate the said parts to form a stitch entirely from the two threads carried by the two needles, combined with the tension device composed of two connected pulleys adapted to move in unison with each other, one for each of the two threads composing the button-hole stitch, and with a nut and spring co-operating therewith, to control the power required to turn the said tension devices together, the movement of the said connected tension devices delivering each a regulated amount of the two threads under uniform tension, all substantially as and for the purpose described.

17. The frame of a sewing-machine carrying the operative parts thereof, and having a longitudinal reciprocating and a periodical lateral oscillating motion, constructed with two arms, one of such arms carrying a reciprocating needle-bar above the cloth-plate and the other arm carrying a looping mechanism below the cloth-plate, substantially as described.

18. The frame of a sewing-machine constructed with two arms, one arm carrying above the cloth-plate a reciprocating needle-bar having a periodical rotary motion, and the other arm carrying below the cloth-plate a looping mechanism having a rotary motion in unison with that of the needle-bar, substantially as described.

19. In a button-hole sewing-machine, the combination, with stitching mechanism, of a starting and stopping device to automatically start and stop the operation of the stitch-forming mechanism, the mechanism that controls the length of the stitch being unaffected thereby, substantially as described.

20. In a button-hole sewing-machine, a main shaft, a belt-wheel, and its eccentric or cam, adapted to be disconnected from said shaft, combined with connecting means to operate the cutter and bring the needles to the starting-point, and adapted to be periodically connected with the main shaft to impart rotary motion to it to operate the stitch-forming mechanism, substantially as described.

In testimony whereof I have signed my name to this specification in the presence of two subscribing witnesses.

JOHN REECE.

Witnesses:
G. W. GREGORY,
L. F. CONNOR.